Figure 4:
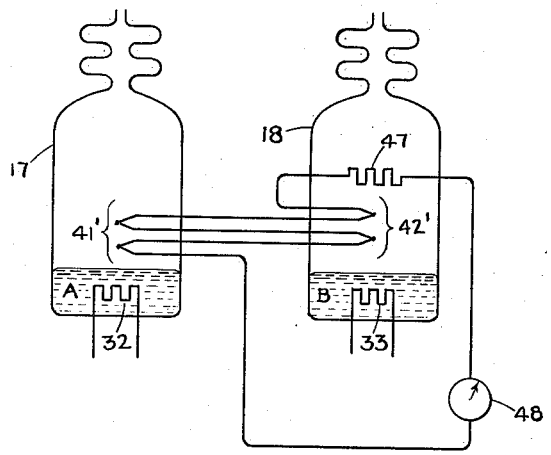

May 6, 1952     T. A. RICH ET AL     2,595,814
THERMAL STANDARD CELL
Filed April 6, 1949     2 SHEETS—SHEET 1
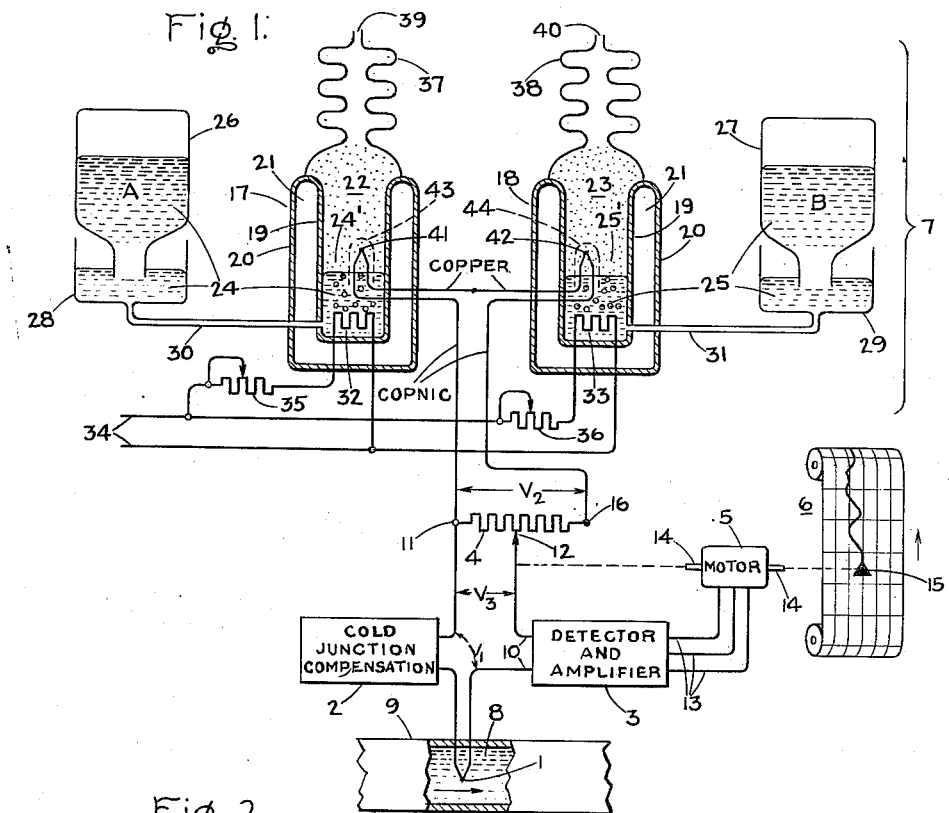
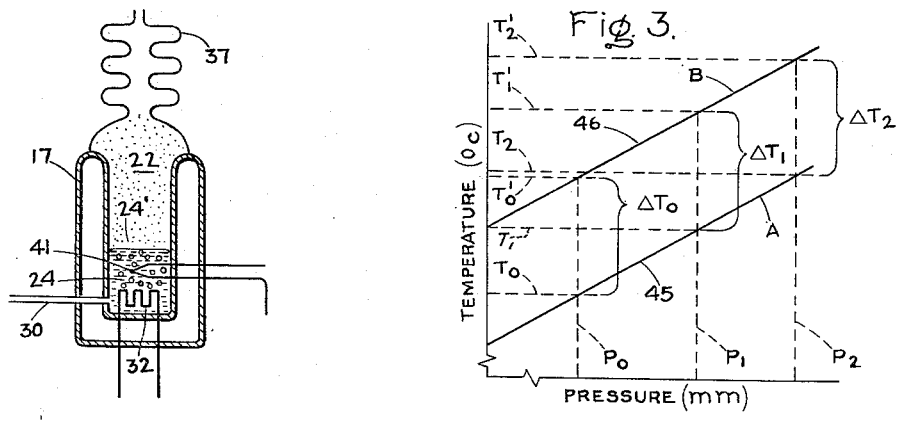
Inventors:
Theodore A. Rich,
John E. Bigelow,
by Richard E. Horley
Their Attorney.

May 6, 1952     T. A. RICH ET AL     2,595,814
THERMAL STANDARD CELL

Filed April 6, 1949

Inventors:
Theodore A. Rich,
John E. Bigelow,
by Richard E. Hosley
Their Attorney.

Patented May 6, 1952

2,595,814

UNITED STATES PATENT OFFICE 2,595,814

THERMAL STANDARD CELL

Theodore A. Rich and John E. Bigelow, Schenectady, N. Y., assignors to General Electric Company, a corporation of New York Application April 6, 1949, Serial No. 85,888

1 Claim. (Cl. 322—2)

Our invention relates to electrical reference devices and more particularly to a new and improved form of standard cell.

In electrical apparatus for precisely measuring or controlling physical quantities, such as temperatures and the like, it is frequently desirable to make use of a reference voltage as a standard of comparison with an unknown signal voltage representing a quantity being measured. This is particularly the case when such a signal voltage is of relatively small magnitude and of necessity must be amplified to be conveniently utilized.

A typical apparatus of the type mentioned is an indicating and recording device wherein a relatively feeble signal voltage, from a thermocouple or the like, is compared with a reference voltage. The difference of the signal and reference voltages is utilized, through the mechanism of an automatic follow-up arrangement, such as a motor-driven slide-wire device, to position a pointer and recording stylus, thereby causing the value of the measured quantity to be indicated and recorded.

A suitable reference voltage may be obtained by the use of a so-called "standard cell." Such a device is commonly understood to include a source of voltage, calibrated to a high degree of accuracy, having a particularly constant and reliable voltage output under specified physical conditions, such as ambient temperatures and load burden imposed upon the cell. In modern applications, industrial and otherwise, it is especially desirable that standard cells be capable of withstanding, without harmful effect, conditions of operation to which associated equipment may be subjected.

Such cells preferably are capable of withstanding freezing and other extremes of ambient temperatures; conditions of overloading; mechanical abuse incurred in transportation from one point to another; and such other abnormal conditions as may reasonably be experienced in common use, without material change of calibration. In certain applications it is desirable to draw from such cells relatively substantial loads for considerable periods of time. Furthermore, it is advantageous to be able to store such cells for considerable periods of time with assurance that the calibrations thereof would not be materially affected. In addition since applications requiring the use of standard cells are large in number, it is desirable that such cells be of simple design and construction to permit ease of manufacture and low cost to the user.

Accordingly, it is an object of our invention to provide a new and improved form of standard cell.

It is another object of our invention to provide a standard cell which may be subjected to a relatively wide range of temperatures, and which may be safely transported from point to point, without loss of accuracy or material change of calibration.

It is a further object of our invention to provide a new and improved standard cell which may be substantially loaded for a considerable period of time, or subjected to overload conditions, without loss of accuracy or material change of calibration.

It is a still further object of our invention to provide a new and improved standard cell which possesses a high degree of accuracy and which is simple in construction, reliable in operation, and inexpensive to manufacture.

In its broadest aspect, our invention makes use of the difference in boiling temperatures of a pair of liquids of particular composition, such difference for certain selected liquids being substantially constant over a considerable range of ambient pressures. According to one embodiment of our invention, we provide suitable vessels for boiling a pair of such liquids by the use of associated heating devices, preferably electrical heating elements submerged therein. To sense the temperatures of the boiling liquids or the saturated vapors thereof, we provide thermo-electric devices, preferably thermocouples, connected in series relation to have an output voltage proportional to the difference of the boiling temperatures.

Thus, our apparatus provides a source of voltage which is dependent only on the boiling temperatures of the liquids used therein, and the voltage output characteristics of the associated sensing devices. Since, as is well known, the boiling temperatures of specified liquids, at particular pressures, are highly stable, and the voltage output characteristics of particular types of thermocouples may be made stable within extremely narrow limits, the apparatus of our invention provides a voltage output which is likewise exceedingly stable and which may be calibrated to a high degree of accuracy.

A particular feature of our invention, especially useful in applications wherein measurements are made utilizing relatively feeble signal voltages obtained from thermocouples or the like, is the provision of a standard voltage of the order of magnitude of such measured voltages. By having standard and measured voltages approximately equal in magnitude, the use of voltage dividers and the like, which are frequently employed with voltage standards providing relatively large voltages with respect to measured voltages, is generally unnecessary.

For a better understanding of our invention, together with further objects and advantages thereof, attention is now directed to the following description and the figures of the accompanying drawings, and also to the appended claim, in which the features of my invention believed to be novel are set forth.

Figure 5:
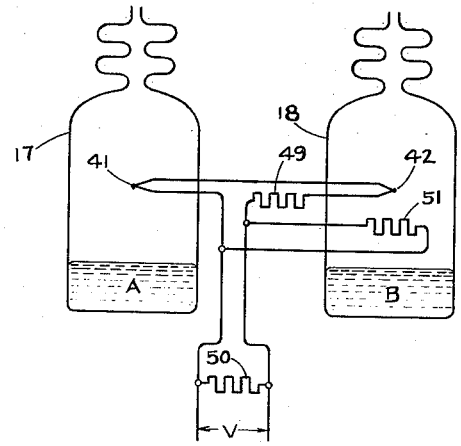

Fig. 1 represents diagrammatically a temperature measuring apparatus of the type having a motor-driven follow-up mechanism, including as a standard cell reference element a preferred embodiment of our invention; Fig. 2 represents a modification of the embodiment shown in Fig. 1; Fig. 3 graphically represents certain physical characteristics of our invention; Fig. 4 represents diagrammatically a current standard provided with compensation for variations in ambient pressure; and Fig. 5 represents a voltage standard also provided with compensation.

Referring now to Fig. 1 of the accompanying drawing, there is shown an electrical measuring apparatus, the function of which is to measure a temperature and record the value thereof on a strip chart. The apparatus comprises generally a sensing element 1, such as a thermocouple, and an associated cold junction compensating device 2, a detector and amplifier 3, a slide-wire device 4, a reversible motor 5, a chart mechanism 6, and a reference voltage device or standard cell, which may be designated as a whole by numeral 7. With the exception of standard cell 7, which is the subject of the present invention and which will be dealt with hereinafter, the apparatus is of a conventional type well known in the art.

Thermocouple 1 is represented diagrammatically as being arranged to sense the temperature of a substance 8 flowing through a pipe 9. One terminal of thermocouple 1 is connected to one terminal of compensating device 2 which may be, for example, a jar containing a mixture of ice and water. The other terminal of compensating device 2 is connected to end terminal 11 of slide-wire 4. The other terminal of thermocouple 1 is connected to one of a pair of terminals of an input circuit 10 of detector and amplifier 3, while the other terminal of input circuit 10 is connected to sliding contact 12 of slide-wire 4. An output circuit 13 of detector and amplifier 3 is connected to the terminals of reversible motor 5, which may be of the split-series field type. The rotating shaft 14 of motor 5 is arranged mechanically to drive sliding contact 12 of slide-wire 4 and move stylus 15 of chart mechanism 6. In the operation of the system as thus far described, a voltage $V_1$ proportional to the temperature of substance 8 surrounding thermocouple 1 is produced across the series-connected combination of thermocouple 1 and compensating device 2.

A reference voltage $V_2$ is impressed by standard cell 7 across the end terminals 11 and 16 of slide wire 4. A voltage $V_3$, comprising a fractional portion of voltage $V_2$, exists across points 11 and 12 of slide-wire 4. Voltages $V_1$ and $V_3$ are connected in series relation causing the voltage impressed on input circuit 10 of detector and amplifier 3 to be the difference of voltages $V_1$ and $V_3$. More particularly, when voltages $V_1$ and $V_3$ are equal in magnitude the voltage impressed across input circuit 10 is zero. The internal arrangement of detector and amplifier 3 is such that motor 5 is energized and caused to rotate in such a manner that sliding contact 12 seeks at all times a position causing the voltage impressed on input circuit 10 to be zero. In other words, the apparatus comprising thermocouple 1, compensating device 2, detector and amplifier 3, slide wire 4, and motor 5 functions as a so-called "null" system. The output shaft of motor 14, in positioning sliding contact 12 also positions stylus 15 to record the value of the temperature sensed by thermocouple 1.

It should be understood that the elements of the apparatus thus far described are of conventional type and do not constitute a part of the present invention. The discussion of the apparatus comprising the elements mentioned is included primarily as an aid in the understanding of our invention, which resides, in the present embodiment, in a new and improved standard cell reference device 7, the function of which is to provide reference voltage $V_1$, as will be presently explained.

Referring now to the bracketed portion of Fig. 1, designated by numeral 7, there is shown an electrical reference device, which we have chosen to call a "standard cell." We provide a pair of vessels 17 and 18 which may be vacuum flasks having inner walls 19 and outer walls 20, separated by substantially evacuated space 21. Vessels 17 and 18 are suitably arranged to contain in cavities 22 and 23 thereof, a pair of liquids 24 and 25 having, as a primary characteristic, different boiling temperatures. The manner of choosing the particular liquids employed will be subsequently described. Associated with vessels 17 and 18, respectively, are a pair of reservoirs 26 and 27, arranged to discharge into a pair of intermediate vessels 28 and 29, the latter being connected to vessels 17 and 18, respectively, by means of tubular passags 30 and 31. Passageways 30 and 31 enter cavities 22 and 23 of vessels 17 and 18 at points beneath the surfaces of liquids 24 and 25. Portions of liquids 24 and 25 are contained in cavities 22 and 23, while other portions are contained in reservoirs 26 and 27, vessels 28 and 29 and passageways 30 and 31. It will be understood that combinations of elements 26, 28 and 30, and 27, 29 and 31, function in the manner of storage reservoirs of the type commonly employed in stock watering devices and the like, in that a relatively constant level of liquid is maintained in vessels 28 and 29 and cavities 22 and 23. Since reservoirs 26 and 27 are sealed by the liquids contained in vessels 28 and 29, partial vacuums existing in reservoirs 26 and 27 tend to prevent escape of liquids 24 and 25 therefrom until the openings thereof are uncovered by lowering of the liquid levels in vessels 28 and 29 to allow gases to enter reservoirs 26 and 27. The entrance of such gases relieves, to some extent, the partial vacuums existing in reservoirs 26 and 27, permitting additional amounts of liquids 24 and 25 to escape therefrom into vessels 28 and 29, thereby increasing the levels of liquids 24 and 25 in vessels 28 and 29 and vessels 17 and 18. The rate of flow of liquids 24 and 25 from vessels 28 and 29 to vessels 17 and 18, respectively, may be controlled by suitably restricting passageways 30 and 31.

To effect boiling of the portions liquids 24 and 25 contained within cavities 22 and 23 of vessels 17 and 18, we provide a pair of heating devices which are represented in Fig. 1 as electrical resistance elements 32 and 33 submerged respectively within liquids 24 and 25. Heating elements 32 and 33 are supplied with electrical energy from a suitable current source 34 through variable resistances 35 and 36 respectively, the latter being employed to adjust the degree of heating of elements 32 and 33.

It will be understood that when boiling occurs within cavities 22 and 23, saturated vapors of liquids 24 and 25 will be formed therewithin above the liquid surfaces and, further, that such vapors will be expelled from the vessels with subsequent loss of liquid. While as previously explained, liquids 24 and 25 will be replenished from other portions thereof contained in reservoirs 26 and 27, it is desirable from the standpoint of ultimate replacement of the liquid supplies, to effect reduction of the rate of liquid loss attributable to expelled vapors, and to reclaim as much of the lost liquids as possible. Accordingly, a pair of condensing devices 37 and 38 is provided, condensers 37 and 38 being attached respectively to the open portions or mouths of vessels 17 and 18. Condensers 37 and 38 may take the form of a plurality of convolutions of a material, such as metal, having a relatively high degree of thermal conductivity. Condensers 37 and 38 are provided with passageways therethrough terminating in openings 39 and 40 which are arranged to be subjected to substantially identical ambient pressures. By the use of condensers 37 and 38 vapors created by boiling of liquids 24 and 25 will, upon contact with the relatively cooler inner surfaces of condensers 37 and 38, tend to condense and return to a liquid state, and be drawn back by gravity forces to the boiling portions of the respective liquids, thereby tending to reduce the rate of liquid loss.

To sense the temperatures of the saturated vapors in the immediate vicinities of boiling liquids 24 and 25, the vaporous regions corresponding thereto being represented by numerals 24' and 25' respectively, we provide a pair of thermo-electric devices which are represented in the present embodiment as a pair of thermocouples 41 and 42 located in vaporous regions 24' and 25'. Depending upon the degree of sensing accuracy desired a number of different arrangements of thermocouples 41 and 42 may be employed. A preferred arrangement in cases where a relatively high degree of accuracy is desired is shown in Fig. 1. In particular, the leads or connections to thermocouples 41 and 42 are brought in beneath the surfaces of liquids 24 and 25 so arranged that when thermocouples 41 and 42 are suitably located in vaporous regions 24' and 25', the leads of thermocouples 41 and 42 are submerged in boiling liquids 24 and 25. The effect of submerging the leads of thermocouples 41 and 42 is to provide thermal "guards" to maintain such leads at temperatures very close to the actual temperatures being sensed in vaporous regions 24' and 25'. In this manner, high temperature gradients are avoided in the leads to thermocouples 41 and 42 which would tend to impart false indications of the temperatures being sensed.

In the arrangement of Fig. 1, we provide, additionally, a pair of wicks 43 and 44 arranged to contact thermocouples 41 and 42, respectively, and to extend beneath the surfaces of boiling liquids 24 and 25. By the use of wicks 43 and 44, which are preferably formed of a pliable, absorbent material such as cotton, thin films of liquid are conveyed to thermocouples 41 and 42 to provide a wetting action on the surfaces thereof, thereby causing the temperature sensing characteristics of thermocouples 41 and 42 to be more rapid and reliable, than would otherwise be the case.

It will be understood that conditions of "superheating" may exist in boiling liquids 24 and 25 causing the actual temperatures therein to differ, in certain cases by several degrees, from the true boiling temperatures thereof. By placing thermocouples 41 and 42 in vaporous regions 24' and 25', and by the use of wicks 43 and 44, we have found that the true boiling temperatures of liquids 24 and 25 may be sensed and errors introduced by accidental superheating may be eliminated.

In cases where lesser degrees of accuracy are required, it may be desirable from the standpoint of simplicity and economy of construction to locate sensing elements, such as thermocouples 41 and 42, beneath the surface of boiling liquids such as liquids 24 and 25, and thus to sense the actual temperatures therein without regard to accidental superheating. Such an arrangement is shown in Fig. 2, wherein a single vessel and associated elements, similar to and having the same numerals as one of the groups of elements of Fig. 1, are shown. In particular, it will be seen that thermocouple 41 is located beneath the surface of boiling liquid 24 as previously described. With this arrangement a wick, such as wick 43 of Fig. 1, is unnecessary since excellent thermal transfer characteristics are obtained by the intimate contact of thermocouple 41 and liquid 24.

The theoretical considerations on which our invention is based are graphically represented in Fig. 3, wherein curves 45 and 46 represent the boiling temperature vs. ambient pressure relationships of liquids 24 and 25 of Fig. 1, designated as A and B, respectively. It is well known that such temperature-pressure characteristics are very nearly linear functions for small pressure changes and as such are represented graphically by straight lines having the general mathematical expression $T = T_0 + K(P - P_0)$, wherein T is the boiling temperature of a particular liquid at a particular pressure P with respect to the standard boiling temperature $T_0$ thereof at a standard pressure $P_0$, and K is a constant temperature-pressure coefficient, the value of which depends upon the particular liquid employed. Ideally liquids A and B are selected to have identical constant $K_A$ and $K_B$ in which case the straight lines 45 and 46 of Fig. 3 have a parallel relationship.

In particular, in Fig. 3, curves 45 and 46 are assumed to be essentially straight lines and any tendency thereof to depart from true parallelism is ignored. For the sake of illustration a number of values of ambient pressure are indicated in Fig. 3 as $P_0$, $P_1$, and $P_2$. The boiling temperatures for liquids A and B corresponding to a reference pressure $P_0$ are represented in Fig. 3 as points $T_0$ and $T_0'$ on curves 45 and 46 respectively, and the difference of $T_0$ and $T_0'$ is indicated as $\Delta T_0$. The boiling temperatures of liquids A and B at other ambient temperatures $P_1$ and $P_2$ are similarly indicated as $T_1$ and $T_1'$ and $T_2$ and $T_2'$, the differences corresponding thereto being indicated by $\Delta T_1$ and $\Delta T_2$ respectively. Since, as previously assumed, straight lines 45 and 46 have substantially identical slopes, it follows that $\Delta T_0$ and $\Delta T_1$ and $\Delta T_2$ are substantially identical quantities, which is a mathematical manner of indicating that the difference in boiling temperatures of a pair of liquids having substantially equal temperature-pressure coefficients are substantially constant with variable ambient pressure conditions.

While, as previously indicated, it is desirable to use a pair of liquids having identical temperature-pressure coefficients, it may be necessary to use a pair of liquids having slightly different temperature-pressure coefficients. In certain applications where a high degree of accuracy is not essential it may be possible to tolerate a variation in the difference of boiling temperatures with changing ambient pressure. However, in other cases, it may be desirable to provide compensating devices which permit the attainment of a higher degree of accuracy. We therefore provide, in the following modifications of the general embodiment described above, arrangements whereby such compensation may be effected.

It will be helpful in the understanding of our invention to examine the temperature-pressure relationships for a pair of liquids having slightly different temperature-pressure coefficients. For example, let it be assumed that liquid A is water, the temperature-pressure relationship thereof being represented by the expression $$T_A = 100 + 0.36(P-760)$$

wherein $T_A$ is the boiling temperature of water expressed in degrees centigrade for a particular ambient pressure P expressed in millimeters of mercury. Let it be assumed that liquid B is o-toluidine having a temperature-pressure relationship $T_B = 199.7 + 0.58(P-760)$, wherein similar characters are employed. Curve 45 in Fig. 3 represents the temperature-pressure characteristic of liquid A, assumed to be water, while curve 46 represents the characteristic of liquid B, assumed to be o-toluidine. It will be understood that for the assumed liquids curves 45 and 46 in Fig. 3 are not parallel lines but have a degree of divergence, since, as previously explained, the temperature-pressure coefficients of the assumed liquids A and B are not identical. Therefore, the difference in boiling temperatures of liquids A and B represented as $\Delta T_0$, $\Delta T_1$, and $\Delta T_2$, are not equal for corresponding pressures $P_0$, $P_1$, and $P_2$, but may be represented by the relationship $$\Delta T = 99.7 + 0.22(P-760)$$

Accordingly, a change in pressure P of approximately 5.0 mm. gives an error of approximately 0.1 percent in voltage output of the thermocouple devices 41 and 42 shown in Fig. 1.

In Fig. 4, we show an arrangement to compensate for the variation of $\Delta T$ in a system making use of our invention as a current standard. The elements represented in Fig. 4 are the same as those represented in Fig. 1 with the exception that a plurality of thermocouple devices grouped in arrangements commonly known as thermopiles and designated by numerals 41' and 42' in Fig. 4, are substittued for thermocouples 41 and 42 shown in Fig. 1. Thermopiles of the type shown may be conveniently used when it is desired to secure a greater electrical voltage output than is provided by a single pair of thermocouples.

Thermopile 41' is arranged to sense the boiling temperature of liquid A, while thermopile 42' is arranged to sense the boiling temperature of liquid B. Thermopiles 41' and 42' are connected in series relation in a manner to provide a source of potential responsive to the difference of the temperatures sensed by thermopiles 41' and 42'.

To provide compensation for the difference in temperature-pressure coefficients of liquids A and B, we make use of the resistance-temperature characteristic of a resistance, designated by numeral 47. Resistance 47 is positioned in proximity to thermopile 42' so that both resistance 47 and thermopile 42' are subjected to substantially identical temperatures.

In the arrangement of Fig. 4, thermocouples 41' and 42' are connected in a series with resistance 47 and an impedance comprising an indicating instrument 48. The electrical voltage developed in thermopiles 41' and 42' due to heating of thermopiles 41' and 42' by boiling liquids A and B causes a current to flow in resistor 47 and instrument 48.

With the assumed chosen liquids if the ambient pressure P is increased, it will be seen from the relationship given above for the difference $\Delta T$ in boiling temperatures of liquids A and B, that such difference becomes greater with increasing pressure. As is well known, the voltage output of a pair of thermopiles, such as thermopiles 41' and 42', is approximately directly proportional to the temperature difference sensed thereby. Accordingly, in the circuit comprising thermopiles 41' and 42', resistance 47, and instrument 48, increasing voltage output of thermopiles 41' and 42' tends to cause an increase in the current flowing in the circuit. However, by choosing for resistance 47, a resistance material having a suitable resistance-temperature coefficient and by subjecting resistance 47 to the boiling temperature of liquid B, resistance 47 may be made to increase at a rate comparable to the rate of increase of $\Delta T$ with increase of ambient pressure P. For the assumed liquids, water and o-toluidine, a resistance material having a resistance-temperature coefficient of 0.004 ohm per ohm per degree centigrade provides very nearly exact compensation.

In Fig. 5 there is shown an arrangement to compensate for the variation of $\Delta T$ in an arrangement making use of our invention as a voltage standard. The elements represented in Fig. 5 are the same as those represented in Fig. 1. In the circuit of thermocouples 41 and 42, we provide a plurality of resistances, designated as 49, 50, and 51, for the purpose of compensating the output voltage V from thermocouples 41 and 42 for variations in $\Delta T$ with variations in ambient pressure P. A circuit is formed comprising thermocouples 41 and 42, resistance 49 and the parallel combination of resistances 50 and 51. Resistances 49 and 50 are formed of a resistance material having an exceedingly small resistance-temperature coefficient, hence resistances 49 and 50 are substantially constant over a wide range of temperatures. Resistance 51, however, is formed of a material having a negative resistance-temperature coefficient, such as a thermistor, and is subjected to substantially the same temperature as thermocouple 42. Thus as $\Delta T$ increases, due to an increase in ambient pressure P the voltage output of thermocouples 41 and 42 likewise increases, tending to cause an increase in the current flow in resistances 49, 50 and 51. However, with increasing temperature the value of resistor 51 tends to decrease while the values of resistances 49 and 50 remain constant. Therefore, the voltage across the parallel combination of resistances 50 and 51 may be made to remain constant by suitable choice of values of resistances 49, 50 and 51, and by the choice of a material having a suitable resistance-temperature coefficient for resistance 51.

Typical satisfactory resistance values, using for resistance 51 a material having a negative resistance-temperature coefficient of 0.03 ohm per ohms per degree centigrade, are as follows: Resistance 49, 10 ohms; resistance 50, 100 ohms; resistance 51, 62.6 ohms.

It will be understood that compensation for variation of output voltage in the arrangements of both Figs. 4 and 5, due to variations in boiling temperatures, is provided by the use of temperature-responsive resistance devices. In each case such a resistance device is arranged to sense one of the boiling temperatures, and to cause an increase or decrease in circuit resistance as required by the particular arrangement employed. Errors which may be introduced in such arrangements by variations in the temperatures to which the temperature-sensing elements such as thermocouples 41 and 42 may be subjected, may be compensated in general by suitably proportioning the values of circuit components, such as resistors 49, 50 and 51.

It is also possible to employ thermocouples which do not have an exact linear relationship between voltage and temperature which has been assumed herein. In some thermocouples this variation tends to be self-compensating with the particular liquids used. In any event the methods shown herein can be applied to compensate for such errors.

While we have shown and described a preferred embodiment of our invention, it will be understood that our invention may well take other forms and we, therefore, aim in the appended claim to cover all such changes and modifications as fall within the true spirit and scope of our invention.

What we claim as new and desire to secure by Letters Patent of the United States is:

In combination, a pair of vessels having the inner portions thereof exposed to the atmosphere, a pair of liquids having different boiling temperatures, said liquids being separately contained in said vessels and subjected to varying pressures, said liquids having substantially parallel vapor pressure vs. temperature characteristics at atmospheric pressures, electrical heating means for maintaining said liquids at said boiling temperatures, means including a pair of electrical devices for sensing said temperatures, said sensing devices being arranged to have an output voltage responsive to the difference of said boiling temperatures, means comprising a temperature-responsive resistance arranged to sense one of said temperatures, said resistance being connected with said devices to maintain said output substantially constant for variations in said pressure.

THEODORE A. RICH.
JOHN E. BIGELOW.

REFERENCES CITED

The following references are of record in the file of this patent:

UNITED STATES PATENTS

| Number | Name | Date |
| --- | --- | --- |
| 2,312,022 | Brooks | Feb. 23, 1943 |
| 2,463,944 | Borden | Mar. 8, 1949 |

FOREIGN PATENTS

| Number | Country | Date |
| --- | --- | --- |
| 350,285 | Great Britain | June 11, 1931 |